United States Patent [19]

Martenson

[11] 4,444,714

[45] * Apr. 24, 1984

[54] METHOD OF COLORING RESIN PRODUCTS

[75] Inventor: Irvin W. Martenson, Brea, Calif.

[73] Assignee: American Organics Corporation, Placentia, Calif.

[*] Notice: The portion of the term of this patent subsequent to Jul. 27, 1999 has been disclaimed.

[21] Appl. No.: 391,488

[22] Filed: Jun. 24, 1982

Related U.S. Application Data

[62] Division of Ser. No. 191,320, Aug. 26, 1980, Pat. No. 4,341,565.

[51] Int. Cl.³ .................... B29B 1/00; B29F 1/00
[52] U.S. Cl. .................................... 264/328.18
[58] Field of Search .............. 264/75, 328.18, 349

[56] References Cited

U.S. PATENT DOCUMENTS

| | | | |
|---|---|---|---|
| 2,470,001 | 5/1949 | Stober | 264/75 X |
| 2,885,360 | 5/1959 | Haden | 106/311 X |
| 3,453,131 | 7/1969 | Fadner | 106/307 X |
| 3,706,825 | 12/1972 | Hall | 264/75 |
| 3,833,467 | 9/1974 | Spiller | 106/308 N |
| 3,857,718 | 12/1974 | Shank | 106/308 F |
| 3,864,294 | 2/1975 | Busch | 106/308 N |
| 4,240,951 | 12/1980 | Moll | 106/308 N X |
| 4,289,408 | 9/1981 | Langlois | 264/328.18 X |

*Primary Examiner*—Thomas P. Pavelko
*Attorney, Agent, or Firm*—Fischer, Tachner & Strauss

[57] ABSTRACT

There is disclosed a stable liquid gel of colorants useful for incorporation in thermoplastic and thermosetting resins. The liquid gel comprises a liquid vehicle which is a plasticizer for the resins and which is gelled by an organophilic, expanding lattice clay which is ion exchanged with alkyl ammonium ions. Preferably the gel is modified by the addition of certain hydroxyalkyl fatty amines or fatty imidazolium quaternaries. The clay is employed at a sufficient concentration to form a stable gel and is milled into the liquid vehicle to form a pre-gel of substantially lesser than the final, desired viscosity. Solid, subdivided colorants are blended into the pre-gel at a concentration from 10 to about 70 weight percent and the resultant mixture is milled to the final desired viscosity. The presence of the fatty amine or fatty imidazolium compounds greatly increases the colorant loading capacity of the gel and imparts desirable properties to the molded products such as reduced brittleness and anti-static properties.

4 Claims, No Drawings

METHOD OF COLORING RESIN PRODUCTS

REFERENCE TO RELATED APPLICATIONS

This application is a division of parent application Ser. No. 191,320 filed Aug. 26, 1980 now U.S. Pat. No. 4,341,565.

BACKGROUND OF THE INVENTION

1. Field of Invention

This invention relates to colorants for plastics and, in particular, to a stable liquid color composition.

2. Brief Statement of the Prior Art

Colors have commonly been incorporated in the pellets of molding resins supplied to fabricators. The desire for flexibility in changing color of molded parts and to avoid large inventories of colored pellets has promoted the addition of colors during the molding or fabrication of plastic products. Finely powdered dyes and pigments have been employed, however, many of these form hazardous dusts, presenting inhalation toxicity problems and present contamination and clean-up problems. The pigments have also been dispersed in various liquids to provide liquid colorants that can be metered into the molding equipment with a small injection pump. Since most of the colorants are solid pigments, and are often high density metal oxides and salts, difficulties have been experienced in providing a stable suspension of these materials in a liquid vehicle. Additionally, the choice of a suitable liquid for use as the vehicle for the pigment suspension is limited since the liquid must be compatible with the resin, must be inert under the molding conditions, and must resist weathering and solvent attack in the finished product. Heretofore, no liquid colorant composition has been provided which has these necessary properties. The most promising prior attempts have resulted in liquid suspensions of limited stability which must be stirred prior to use to redisperse the settled pigments. The necessary stirring is undesirable, not only because of the additional step, but also because stirring often incorporates air bubbles in the liquid, causing errors in the metering system and imperfections in the color of the molded products.

BRIEF STATEMENT OF THE INVENTION

This invention comprises a liquid colorant composition having a prolonged shelf life. The liquid colorant comprises a liquid gel suspension of organic pigments in a finely subdivided state. The solid pigments are retained in suspension in the liquid gel for prolonged periods, providing a liquid colorant resistant to settling and to viscosity changes. The liquid colorant comprises a suspension of from 10 to about 70 weight percent of finely subdivided pigments in a liquid gel which is prepared by mixing from one to about five weight percent of an organophilic, expanding lattice clay with a liquid plasticizer. The liquid plasticizer employed is inert under the molding conditions and compatible with the resin, and for this purpose, can be a saturated mono- or di-basic alcohol having from about 2 to 20 carbons esterified with a di- or tri-basic, saturated or aromatic acid, or phosphoric acid. The colorant composition is prepared by blending the organophilic clay and plasticizer and milling the resultant mixture to form a pre-gel. The milling step is interrupted before the resulting pre-gel achieves its maximum viscosity, typically when the pre-gel has a viscosity from about 1,000 to about 3,000 centipoise seconds, Brookfield. The pigments in a finely subdivided state, typically from 0.05 to about 25 microns average particle diameter are blended into the pre-gel and the resultant mixture is milled to the desired final viscosity, typically from 2,000 to about 15,000 centipoise seconds. The solids content of the colorant can be widely varied, depending on the density and particle size of the particular pigment. The solids content will be from 10 to about 70 weight percent. It has also been found that the addition of certain hydroxyalkyl fatty amines or fatty imidazolium quaternaries to the mixture at concentrations from about 0.5 to about 5 weight percent will significantly lower the viscosity, thereby permitting formulation of very high solid content compositions which have suitable viscosities for metering and injection into the molding process. These additives also improve the physical properties of the molded products.

DESCRIPTION OF THE PREFERRED EMBODIMENT

This invention comprises a liquid colorant composition which is stable and resistant to settling or viscosity changes. The invention also includes a method for preparation of the liquid colorant composition. The liquid colorant composition can include substantially all pigments and color bodies such as organic and inorganic pigments and special colorants such as fluorescent, phosphorescent, pearlescent, and metallic pigments.

The composition of the major ingredients of the colorant composition and its optional ingredients are set forth in the following table:

TABLE 1

| Colorant Ingredient | Broad Weight Percent | Preferred Weight Percent |
| --- | --- | --- |
| Plasticizer | 30–90 | 35–55 |
| Organoclay | 1–5 (1) | 1.5–3 (1) |
| Modifier (2) | .1–50 | .5–25 (1) |
| Pigment (4) | 10–70 | 45–65 (3) |
| Gloss Agent (2) | 0.0001–0.01 | 0.00015–0.001 |

(1) Expressed as percentage of pre-gel (vehicle)
(2) Optional ingredient
(3) With carbon black, the preferred range is 12–15 percent
(4) With metallics, the preferred ranges is 14–20 percent
(5) Expressed as percentage of final colorant composition.

The plasticizer used in the liquid colorant is a liquid plasticizer that is compatible with molding resins and inert under the molding and injection conditions. Additionally, the liquid should be a stable plasticizer in the final product, resistant to weeping from the product and resistant to weathering and solvent attack. Suitable plasticizers are esters of saturated mono- or di-basic alcohols, having from 2 to about 20 carbons with di- or tri-basic, saturated aliphatic or aromatic acids or phosphoric acids. Examples of suitable alcohols include ethylene glycol, propylene glycol, hexamethylene glycol, 2,3-butanediol, 2,3-pentanediol, 1,7-heptanediol, 4,5-octanediol, etc. Examples of useful monoalcohols comprise hexanol, amyl alcohol, octanol, isononanol, 2-ethylhexanol, decanol, hexadecanol, etc.

The aforementioned mono- or di-basic alcohols are esterified with a di- or tri-basic saturated or aromatic acid or phosphoric acid. Examples of suitable saturated, aliphatic acids include the alpha, omega-aliphatic acids such as oxalic, succinic, adipic, pimelic, suberic, azealic acids, etc., and other aliphatic dicarboxylic acids such as 1,3-heptanedioic acid, 2,5-octanedioic acid, 1,5-nonanedioic acid, etc. Suitable aromatic acids comprise the dicarboxylic aromatic acids such as phthalic, isophthalic, terephthalic, benzoic, methylbenzoic acid, trimellitic acid, etc. Di- and tri-alkyl esters of phosphoric acid can also be employed as the liquid carrier.

Examples of preferred plasticizers include those that are commercially available such as dioctyl adipate, di-2-ethyl hexyl azelate, ethylene glycol dibenzoate, dilauryl phosphate, trihexyl phosphate, dioctyl phthalate, diisononyl phthalate, di-2-ethyl hexyl terephthalate, dioctyl terephthalate, diisodecyl phthalate, diphenyl phthalate, dicyclohexyl phthalate, dibutyl phthalate, etc.

The aforementioned plasticizer is formed into a pre-gel by incorporating an organophylic clay into the plasticizer under high shear conditions. Useful clays are swelling or expanding lattice clays such as found in Wyoming, South Dakota, Montana, Utah, Nevada and California. These expanding lattice clays include montmorillonite, vermiculite, nontronite, saponite, hectorite, etc., all having a three layer crystals. These clays are commonly found in admixture in bentonite clays having an average aluminum oxide content less than about 20 weight percent. The bentonite clays also have a high ion exchange capacity, commonly between about 50 and 150 milliequivalents, per 100 grams of the air-dried clay.

The aforedescribed clays are usually found in a form wherein the ion exchange sites are occupied with alkali and/or alkaline earth metals. The clays can be ion exchanged with an alkyl ammonium compound to form the organophylic clay or can be treated to exchange the alkali or alkaline metals with hydrogen and the resultant hydrogen substitution is accomplished simply by acid washing the solid clay using a dilute mineral acid such as hydrochloric, nitric or sulfuric acid, and separating the solid from the acid by settling or filtering. A suspension of the clay can also be converted to the hydrogen form by passing the suspension over a hydrogen charged ion exchange solid such as Amberlite and the resultant aqueous suspension of hydrogen clay can be reacted with the alkylamine. The organophylic clays are also commercially available from a number of sources, one class is designated as Bentone, available from National Lead Company.

The alkylammonium groups which are ion exchanged onto the clay can be mono, di, tri or tetra-alkyl ammonium ions wherein the alkyl groups have from one to about twelve carbons. Examples of suitable ammonium ions for preparation of an organophyllic clay are tetramethyl ammonium ion, 2-ethylhexyl ammonium ion, triethyl ammonium ion, dioctyl ammonium ion, tetrabutyl ammonium ion, etc.

The organophylic clay is employed in a finely subdivided state, typically in a powder form having a partical diameter passing a 20 mesh and retained on about 325 mesh Standard screen.

The powdered organophylic clay is mixed with the plasticizer in the desired proportion and the resulting mixture is subjected to high shear forces, preferably by passing the mixture through a conventional blending mill. During the milling of the mixture, it will be observed that the viscosity of the mixture increases, reflecting the formation of a gel. The mixture is not milled to its maximum viscosity but, instead, the milling operation is interrupted when the viscosity of the mixture reaches a value from about 1,000 to 3,000 centipoise second, Brookfield. The resultant pre-gel is thereafter blended with the pigments to be employed in the liquid colorant composition.

The pigments which are employed in the liquid colorants can be organic or inorganic finely subdivided solids. The inorganic pigments include oxides and salts of metals such as titanium, iron, lead, zinc, cadmium, mercury, chromium, molybdium, etc. Titanium dioxide in both anatase and rutile crystal form is the predominately used white pigment. Iron oxides are used for red, brown and tan colors; lead chromate is used for yellow, lead molybdates for orange, red, and related colors, and mixtures can be prepared for varied shades of orange. Lead chromate is also combined with iron blue, ferric-ferroyanide, to prepare green colors. The cadmium salts and oxides are used for red, maroon and yellow shades and other salts include the aluminates such as cobalt aluminate or titanates such as chromium titanate.

Organic pigments which are used in the invention are the conventional organic pigments employed in molding resins, including azo compounds which have one or two azo linkages to provide orange, yellow and red pigments. The azo groups are typically in aromatic compounds which include napthol or toluidine groups. Some of the azo pigments include chelate metals, eg, chelated nickel yellow. Another class of organic pigments are the phthalocyanine greens and blues. Colors of red, maroon, and violet can be obtained with the quinacridone pigments. The isoindolinones are a group of pigments in the red to yellow color range. The anthraquinones such as anthraquinone red, indathrone blue, anthrapyrimidine yellows are also suitable for use in the invention.

Carbon black is widely used as a pigment for a black coloration and typically carbon blacks are effective at relatively low concentrations and are available in a very finely subdivided state for use in the invention.

Special color effects can also be imparted in the liquid colorants. These special effects include the metallics in which finely subdivided metal powders such as aluminum and aluminun alloys are used to produce brilliant blue-white highlights and copper and copper alloys with zinc are used to produce gold and bronze highlights. These can be admixed with dyes or organic or inorganic pigments to impart a metallic luster to the molded products. Pearlescent effects can be also achieved using lead carbonate or other commercially available pearlescent colorants in combination with other pigments.

The pigments are employed in a finely subdivided state, typically having particle diameters from 0.05 to about 25 microns, preferably from 0.5 to about 15 microns. Carbon blacks are usually in the most subdivided state, typically with particle diameters from about 0.05 to about 10 microns and the inorganic pigments including the metallics are usually in the size range with average particle diameters from 1 to about 10 microns. The pigments are employed at the maximum solid concentrations possible for the desired final viscosity. The actual concentration varies somewhat with the density and identity of the particular pigment; generally the range is from 45 to about 75 weight percent solids for the inorganic and organic pigments and is from 9 to about 15 weight percent, preferably from about 10 to 12 weight percent for carbon black.

The solid pigments are incorporated in the liquid colorant compositions by mixing the pigment with the pre-gel and milling the resultant admixture under high shear forces to thoroughly blend and admix the pigments. This milling results in an increase in the viscosity of the liquid from the range of about 1,000–2,000 centipoise seconds in the final product. The final viscosity varies somewhat for the particular injection pump which is to be used for the metered injection of the liquid colorant into the molding system. Various metering pumps are available, however, a particularly useful injection pump is that marketed by the RS Corcoran Company, New Lennox, Illinois and, for this pump it is desirable to have viscosity of the final product at a value from 5,000 to 9,000 centipoise seconds.

Various additives can be included in the composition. It has been found that the addition of certain hydroxyalkyl long chain aliphatic (fatty) amines or long chain aliphatic (fatty) imidazolinium quaternary compounds enhance the stability of the composition and permit high loadings of colorants. These "modifiers" also enhance the properties of the molded products, e.g., by reducing the brittleness of products. The hydroxyalkyl fatty amines which are useful have the following formula:

$$(OHR_1)_n-N-R_2$$

wherein:

$R_1$ is a $C_1$ to $C_8$ alkylene such as methylene, ethylene, propylene, butylene, pentylene, octylene, etc.;

$R_2$ is a $C_{10}$ to $C_{22}$ aliphatic group such as decyl, oleyl, palmyl, stearyl, myristyl, linoleyl, etc.; and n is 1 or 2.

These compounds are commonly derived from animal and vegetable fats and oils and are accordingly referred to by source, e.g., hydroxyalkyl derivatives of coco amine, tallow amine, etc.

Suitable compounds are N-hydroxyethyl coco amine, N,N-bis-hydroxyethyl coco amine, N,N-bis-hydroxyethyl tallow amine, hydroxypropyl oleylamine, N,N-bis-hydroxybutyl linoluylamine, etc. The preferred class of these additives are the N,N-bis-compounds, wherein n is equal to 2 in the above formula.

Another class of useful modifiers which also permits high colorant loadings is certain derivatives of fatty imidazolinium quaternaries. These have the general formula:

$$[R-C\diagup\substack{N-CH_2\\ \\N-CH_2}\diagdown\substack{\\ \\CH_2-CH_2NH-\overset{O}{\overset{\|}{C}}-R}]^+X^-\quad CH_3$$

wherein:

R is a $C_{10}$ to $C_{22}$ aliphatic group such as decyl, oleyl, palmyl, stearyl, myrisyl, linoleyl, etc.; and X is $C_1$ to $C_5$ alkyl sulfate such as methyl sulfate, ethyl sulfate, propyl sulfate, isopropyl sulfate, etc., such as methyl sulfate, ethyl sulfate, propyl sulfate, isopropyl sulfate, etc.

Examples of suitable compounds in this class are:

methyl-1-hydrogenated tallow amido ethyl-2-hydrogenated tallow imidazolinium-methyl sulfate;

methyl-1-tallow amido ethyl-2-tallow imidazolinium-methyl sulfate;

methyl-1-oleyl amido ethyl-2-oleyl imidazolinium-methyl sulfate; and 1-ethylene bis (2-tallow, 1-methyl, imidazolinium methyl sulfate).

The aforementioned modifiers are employed at concentrations of from 0.1 to about 50 weight percent, preferably from about 0.5 to about 25 weight percent of the pre-gel to achieve a desirable viscosity reduction of the solid suspension and to permit a high concentration of solids colorants in the composition.

Another additive which can be employed in the liquid colorant composition to achieve a desirable high gloss finish on the molded products is silicon fluid such as a polydialkylsiloxane, which has the formula:

$$(R_1)_3SiO[(R_1)_2SiO]_xSi(R_1)_3$$

wherein:

$R_1$ is a $C_1$ to $C_5$ alkyl, e.g., methyl, ethyl, isopropyl, butyl, etc.; and x is from 1 to 10, preferably from 1 to 4.

An example of a preferred additive of this class is polydimethylsiloxane. The silicon fluid aids in a mold release of the finished product from the mold and in addition, imparts a luster or a gloss to the product. The silicon fluid is typically used at a concentration from 0.0001 to 0.01, preferably from 0.00015 to about 0.001 weight percent of the colorant composition.

The following examples will serve to illustrate a mode of practice of the invention and to demonstrate results obtainable thereby.

EXAMPLE 1

A colorant concentrate composition is prepared by blending together 240 weight parts of dioctyl phthalate, 22 weight parts of N,N-bis-hydroxyethyl tallow amine, 6 parts by weight of Bentone 38, a commercially available tetra-alkyl ammonium smectite. These ingredients are thoroughly mixed on a mill to a viscosity of approximately 1,000 centipoise seconds, Brookfield and then approximately 320 weight parts of an inorganic oxide red colorant is added. The resulting mixture is blended on a mill to provide a viscosity between 5,000 and 5,500 centipoise seconds, Brookfield. The resultant red colorant is extremely stable and the suspended red pigment does not settle during handling and storage of the concentrate. The concentrate is injected into admixture with resin during injection molding applications to produce a red colored product. In particular, the colorant can be used for coloring polycarbonates, Nylons and polyethylene terepthalates (PET) during injection molding to produce products having improved strength properties over the uncolored resins.

EXAMPLE 2

A white colorant composition is prepared by blending approximately 72 parts by weight of dioctyl phthalate, 1.5 parts by weight of the organo expanding lattice clay (Bentone 38) and 0.5 part by weight of N,N-bis-hydroxyethyl coco amine. The resulting mixture is milled to produce a thoroughly admixed composition having a viscosity of approximately 1,000 centipoise seconds, Brookfield and then 6 parts by weight of talc and 73 parts by weight of titanium dioxide are added. The resulting mixture is milled to obtain a final product having a viscosity of approximately 5,000 centipoise seconds, Brookfield. The color concentrate is used for coloring polycarbonate resin by injecting the colorant into admixture with the resin during injection molding of the resin into molded products. The color composition readily disperses into the resin during the molding to produce a uniformly colored product. Strength tests were performed on the products including a standard impact strength test in which a standard weight was dropped approximately 12 feet to impact with the product. It was found that the strength of the product was increased approximately two-fold over products molded with uncolored resin and with resin containing conventional dry colorants.

EXAMPLE 3

A metallic bronze colorant is prepared by blending 140 parts by weight of di-2-ethylhexyl terephthalate, 3 parts by weight of Bentone-38 and 5 parts by weight of N,N-bis-hydroxyethyl tallow amine. The mixture is milled to a viscosity of about 2500 centipoise seconds Brookfield and 30 parts by weight of a bronze metallic powder (copper-zinc alloy) are added. The resulting mixture is milled to a viscosity of approximately 5500 centipoise seconds Brookfield and is used for coloring Nylon by injecting the colorant at a concentration of about 1 percent into admixture with the Nylon during injection molding of the Nylon into molded products. The resultant products have a high metallic luster and a bronze appearance.

The liquid colorants in the invention have been observed to be extremely stable, and resist settling or viscosity changes even upon prolonged storage. The liquid colorants can be used directly without stirring, thereby avoiding the possibility of including air bubbles in the suspension. The molded products obtained from use of the liquid colorants have a uniform coloration and do not discolor or weep. The colorations can be used in high temperature molding operations such as the molding of polycarbonate resins without any impairment of the physical properties of the product, and with many resins, actually improve the physical properties of the molded products. Furthermore, the liquid colorants of the invention can be used with all presently known commercial molding resin systems.

What is claimed is:

1. In a method of injection molding of a plastic product wherein a solid, synthetic molding resin is injection molded into said product, the improved method of incorporating a powdered, solid colorant into said resin which comprises:
   (a) dispersing said powdered solid colorant into a plasticizer for said molding resin and selected from the class consisting of esters of saturated monobasic and dibasic alcohols having from 2 to about 20 carbons and a dibasic or tribasic saturated aliphatic acid or aromatic acid having from 3 to about 12 carbons, or phosphoric acid to form a liquid gel colorant composition; and
   (b) admixing said colorant, plasticizer and from 1 to 5 percent by weight of an organophilic, expanding lattice clay exchanged with alkyl quaternary ammonium ions; and
   (c) injecting said liquid gel colorant composition into said mixture with said molding resin during said injection molding.

2. The method of claim 1 including the addition of from 0.1 to 50 percent of the weight of said liquid plasticizer of a modifier selected from the class consisting of fatty amine derivatives of the formula:

$$(OHR_1)_n-N-R_2$$

wherein:
   $R_1$ is a $C_1$ to $C_8$ alkylene
   $R_2$ is a $C_{10}$ to $C_{22}$ alkyl; and
   n is 1 or 2; and
fatty imidazolinium derivatives of the formula:

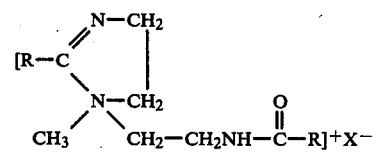

wherein:
   R is a $C_{10}$ to $C_{22}$ alkyl; and
   X is $C_1$ to $C_5$ alkyl sulfate.

3. The method of claim 1 including the steps of milling the plasticizer and organoclay to increase its viscosity, adding to the premilled mixture the aforesaid quantities of powdered, solid colorant, and thereafter milling the resultant mixture sufficiently to effect a further increase in its viscosity.

4. The method of claim 1 wherein said liquid gel colorant composition is injected into said resin at a concentration of about 1 weight percent.

* * * * *